Patented May 22, 1934

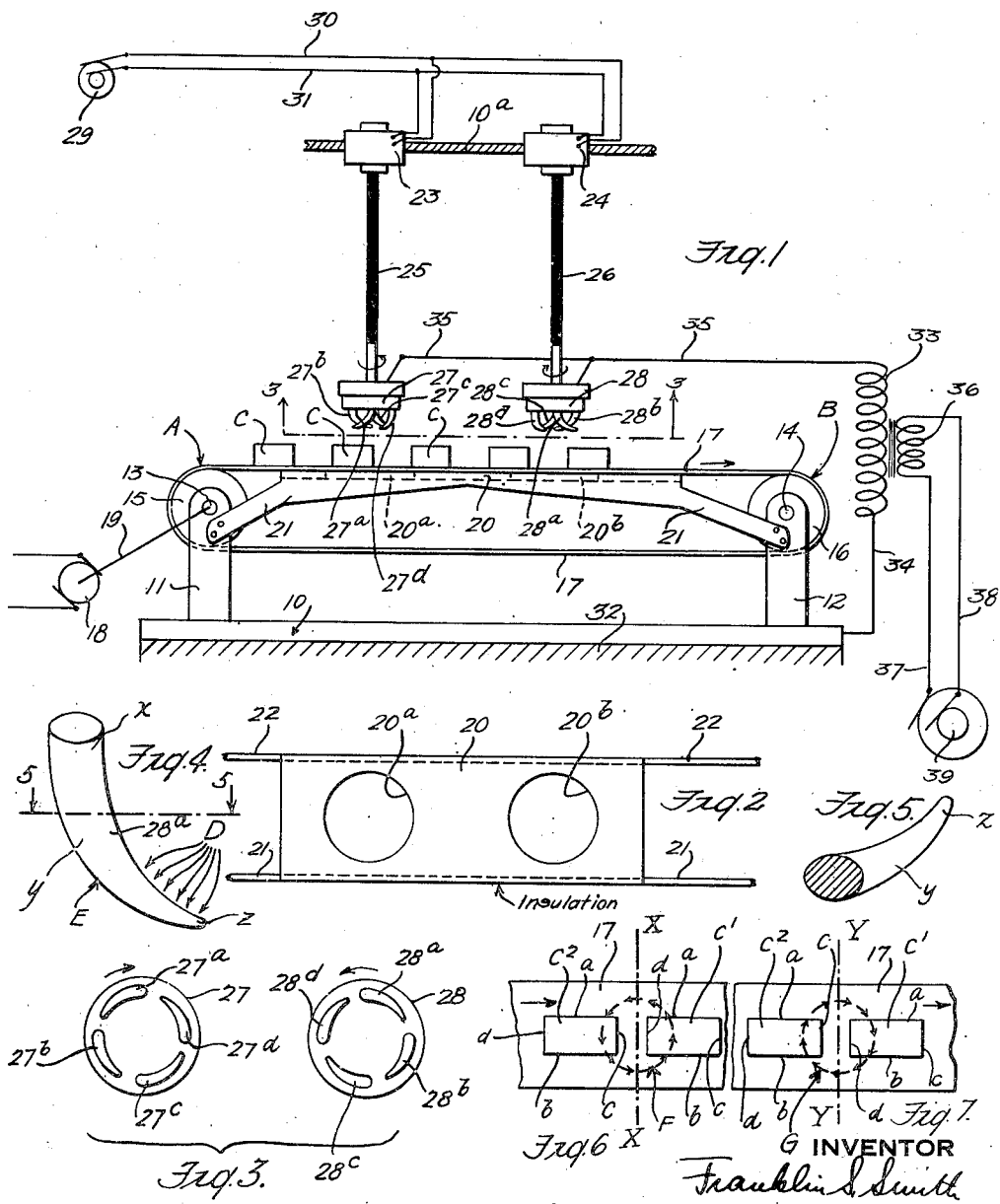

1,959,390

UNITED STATES PATENT OFFICE 1,959,390

ART AND APPARATUS FOR STERILIZING

Franklin S. Smith, New Haven, Conn.

Application August 19, 1931, Serial No. 558,069

15 Claims. (Cl. 175—311)

This invention relates to an art and apparatus for destroying insect life in food and other products.

One of the objects of this invention is to provide a practical art and apparatus for subjecting food and other products that contain insects, and/or their eggs, larvæ and pupæ thereof to efficient and dependable treatment for destroying such insect life as has just been noted. Another object is to provide an art and apparatus for achieving electrically and in a thoroughly dependable, rapid, and efficient manner the destruction of such insect life in such products. Another object is to provide an art and apparatus of the above-mentioned character whereby destruction of insect life may be thoroughly achieved without harm to the product or products, and for achieving this result in an inexpensive, rapid, and efficient manner. Other objects will be in part obvious or in part pointed out hereinafter.

The invention accordingly consists in the features of construction, combinations of elements, arrangements of parts and in the several steps and relation and order of each of the same to one or more of the others, all as will be illustratively described herein, and the scope of the application of which will be indicated in the following claims.

In the accompanying drawing, in which is shown one of various possible embodiments of the mechanical features of my invention, Figure 1 is a front elevation of the apparatus, certain parts being shown diagrammatically;

Figure 2 is a plan view of a belt-support;

Figure 3 is a view on an enlarged scale, as seen along the line 3—3 of Figure 1, of the preferred arrangement of certain electrodes;

Figure 4 is a front elevation on an enlarged scale of an electrode member;

Figure 5 is a horizontal sectional view as seen along the line 5—5 of Figure 4, and Figures 6 and 7 are fragmentary plan views of the conveyor belt showing packages thereon and indicating diagrammatically certain actions thereon of the different electrode structures.

Similar reference characters refer to similar parts throughout the several views of the drawing.

Referring now to Figure 1, there is indicated diagrammatically a suitable frame 10 provided at its respective ends with appropriate pairs of standards 11 and 12 in which are suitably journaled the shaft 13 and 14, respectively, of drums 15 and 16, respectively, about which extends a conveyor belt 17, the latter being made of asbestos or a suitable canvas or cotton material, or the like.

One of the drums, such as the drum 15, is suitably driven and I have diagrammatically indicated a motor 18 connected to the drum 15 by any suitable transmission diagrammatically indicated at 19 for driving the pulley or drum 15 and for thus causing a movement of the belt 17. The direction of drive is preferably such that the drums rotate in clockwise direction and hence so that the upper portion of the belt 17 moves in a direction from the left to the right, as viewed in Figure 1. Illustratively, the rate of drive of the pulley 15 may be such that the movement of the belt 17 takes place at a rate of about 15 feet per minute but it is not to be understood that this is a limiting rate of drive but that the belt may be driven at any other suitable speed.

The belt 17 is adapted to receive at its left-hand end, as at the point A, the material or goods or articles to be sterilized and thus to transport the goods in a direction toward the right and to discharge them at the right-hand end of the belt as at the point B. Any suitable means, not shown, may be utilized to feed the articles onto the belt and to receive them when discharged therefrom.

Underneath the article-carrying portion of belt 17 and extending lengthwise thereof is a plate-like member 20 (see also Figure 2) having a width equal to or greater than the width of the belt 17; member 20 aids to prevent sagging of the belt 17 under its load and insures the passage of the goods or articles to be treated along the intended and predetermined path.

Plate member 20 is made of any suitable solid dielectric material, such as laminated bakelite, and is of itself reinforced by downwardly directed and lengthwise extending members 21 and 22, also of solid dielectric material, which are extended beyond the right and left-hand ends of the plate member 20 to a sufficient extent to be secured to the frame 10, as to the pairs of standards 11 and 12 of the latter.

The upper portion of the frame 10 indicated in Figure 1 at 10ª supports a plurality of electric motors illustratively shown as two in number at 23 and 24, the motors being supported preferably with their shafts extending vertically. To the lower ends of the shafts of these motors are connected driving members 25 and 26, respectively, made of solid dielectric material and these in turn support at their lower ends metallic disk-like members 27 and 28, respectively. Motors 23 and 24 are supplied with energy from any suitable source diagrammatically indicated at 29 through line conductors 30 and 31 and are driven at a speed and in directions illustratively described below.

The metallic disk member 28 has secured to its lower face, as viewed in Figure 1, a plurality of electrode members, illustratively four in number and shown in Figure 1 at 28ª, 28ᵇ, 28ᶜ and 28ᵈ. These electrode members are preferably of identical construction and in Figure 4 one of them, illustratively member 28ª, is shown on an enlarged scale. It will be seen to have a downwardly extending portion indicated at $x$ and a lower end or somewhat pointed portion $z$ connected by an intermediate portion $y$ which is curved in two directions, being curved downwardly and toward the right and, as is better shown in Figures 3 and 5, is also curved to conform relatively closely to the arc of the circle along the circumference of which the four electrode members 28ª, 28ᵇ, 28ᶜ and 28ᵈ are equidistantly spaced. Motor 24 is driven in a direction to cause the electrode structure 28 to rotate in the direction of the arrows indicated in Figures 1 and 3, the portion $x$ of each electrode member being the leading portion and the tip $z$ being the trailing portion.

Disk member 27 is also provided with electrode members, illustratively four in number and shaped substantially like the members above described in connection with the electrode construction 28; they are likewise equidistantly spaced about a circle on the under surface of the disk member 28 (see Figure 3) but, motor 23 being driven so as to rotate disk member 27 in a direction opposite from the direction of rotation of the electrode construction 28, the electrode members 27ª, 27ᵇ, 27ᶜ and 27ᵈ are reversed in position so that again the portions $x$ thereof are the leading portions and the tip or substantially pointed ends $z$ thereof are the trailing portions. This relation of these parts is better shown in Figure 3.

The electrode members depending from the disk members 27 and 28, as appears better from Figure 4, are tapered and are of substantially circular cross-section where the section is taken at right angles through any point along the curved center or axis of the electrode member; this relation is of great advantage inasmuch as the horizontal section taken through any one member, such as the section 5—5 of Figure 4, is substantially elliptical (see Figure 5) and thus gives a section that is substantially stream-line with respect to the actual movement of the electrode member about its axis of rotation. The resultant substantially elliptical or stream-line cross-section is all the more emphasized the nearer that the horizontal section approaches the tip end $z$. The purpose of this construction will be later dealt with herein.

The electrode structures 27 and 28, thus driven in opposite directions, are rotated at a speed illustratively about 1800 R. P. M., the tip ends $z$ thus presenting in a substantially horizontal plane spaced upwardly from the belt 17 the effect of a great multiplicity of individual discharge points. The spacing between the horizontal plane of these discharge points and the upper surface of conveyor belt 17 and through which spacing the products or articles to be sterilized are to pass, may be varied in any suitable manner as, for example, by raising or lowering the frame portion 10ª by any suitable means not shown.

Immediately underneath the rotating electrode structures 27 and 28, plate member 20 is provided with circular openings 20ª and 20ᵇ (see Figures 1 and 2), the diameter of these openings being considerably greater than the diameter of the circle about which the electrode members 28ª, 28ᵇ, etc. and 27ª, 27ᵇ, etc. are spaced about the supporting disks 28 and 27, respectively. For example, openings 20ª and 20ᵇ may be about twice the diameter of the circle of the electrode members.

Frame 10 is maintained at ground potential, resting upon the ground or suitable flooring indicated in Figure 1 at 32. To the ground 32 or to the frame 10 is connected one terminal of the high voltage winding 33 of a transformer, as by conductor 34, while the other terminal of this winding is connected by conductor 35 to the rotating electrode structures 27 and 28, the latter being thus maintained at high potential. The low voltage winding 36 of the transformer is energized by a suitable source of alternating current of relatively high frequency and illustratively and preferably is connected, as by conductors 37 and 38, to an alternator 39 of a frequency on the order of 640 cycles per second. The ratio of transformation is such that the potential applied to the disk electrodes 27 and 28 is on the order of 170,000 volts, that potential difference thus existing between the above described form in effect capacities or condensers in the high voltage circuits of the respective electrodes.

It is to be understood, however, that the specific frequency of 640 cycles above-mentioned is not to be treated by way of limitation and that the same is true with respect to the above-mentioned voltage, these factors, together with the speed of travel of the belt and the thickness and nature of the material to be treated being appropriately proportioned with respect to each other. The illustrative figures above set forth may, however, be considered as illustrative where the material to be treated is, for example, corn-meal that is packaged in packages having a vertical dimension as viewed in Figure 1 of about two inches, thus giving the material undergoing sterilization a thickness of about two inches. Under these illustrative conditions, the spacing of the horizontal plane of the tips $z$ of the electrode members from the upper surface of the corn-meal, shown in Figure 1 as contained in packages C, is about three-eighths of an inch while the spacing of this horizontal plane of the tips $z$ of the electrode members from the other condenser element represented by the frame 10 or the ground 32 is approximately thirty-six inches. If it is desired to use a frequency higher than the illustrative frequency above-mentioned, the speed of the belt may be substantially commensurately increased; likewise by increasing the number of electrode members carried by the disks 27 and 28, a greater speed of travel of the belt may be achieved.

Assuming no material, articles, or products, to be on the belt 17, there is in the circuit of the high voltage winding 33 the parallel capacities 27—10 (or 32) and 28—10 (or 32) and a displacement current flows through these capacities; inasmuch, however, as the effective conducting portions of the electrode constructions 28 and 27 closely approximate points (see the tip ends $z$ of Figure 4) the voltage gradient is high in the region underneath the electrode members 28ª, 28ᵇ, etc. and 27ª, 27ᵇ, etc. and diminishes rapidly as the parts 10 or 32, at ground potential, are approached. Probably about 90% of the voltage drop across the above-mentioned capacities takes place throughout the region above the article-carrying portion of the belt 17.

As the articles or material to be treated, illustratively packaged material such as that above-mentioned and indicated in Figure 1 at C, is placed upon the belt at point A, the articles are brought by the belt first into the region of high voltage gradient underneath the electrode construction 27 and subsequently in a similar region of high voltage gradient immediately underneath the electrode construction 28.

Considering first the action that takes place as the articles come underneath the electrode construction 27, it is first to be noted that the material, illustratively corn-meal, as well as the pasteboard or paper package in which it is contained, has a permittivity that is considerably higher than the air which theretofore constituted the dielectric between the condenser elements 27 and 10 (or 32), the opening $20^a$ in the plate-like supporting member 20 (see Figure 2) being sufficiently great to avoid the inter-positioning between these condenser elements of solid dielectric material having also a permittivity greater than that of air. The material, corn-meal with its package, and hereinafter referred to, for convenience, as the "material C" is carried by the belt across and over the opening $20^a$ in the supporting plate 20, and, having a higher permittivity as above-mentioned, brings about such a re-distribution of the potential difference between the parts 27 and 10 (or 32) that the now serially related dielectrics between the parts 27 and 10 (or 32) represented by the material C and the air above and below the latter are incapable of withstanding the potential difference with the result that a corona discharge takes place from the tip ends $z$ of the electrode members $27^a$, $27^b$, etc. and through the material C.

However, the paper or pasteboard constituting the package within which the corn-meal is contained is not punctured by this corona discharge, the walls of the carton or package acting as condenser dielectrics in the high voltage circuit; the air within the carton and intervening the particles of the corn-meal as well as the air between the carton and the electrode tips $z$ of the member 27 is in the field of high voltage gradient and is thus easily and quickly ionized, having also a low dielectric time lag, while the air dielectric between the belt and the frame 10 (or ground 32), because of the relatively great length of the flux path therethrough and because of the relatively low voltage gradient throughout that path, is not ionized at all and is thus incapable of breaking down, thus preventing a complete disruption of the gap between the tips $z$ of the electrode structure 27 and the other condenser element 10 (or 32). I may, however, shorten this flux path, as by diminishing the height of the belt from the grounded portions 10 or 32 so that some ionization of the air dielectric in this path may take place with or without accompanying local corona discharge. But the shorter that I make this flux path, the more intense are the individual corona streamers emanating from the individual electrode members or tips and the less are they in number; however, I prefer the arrangement above initially described inasmuch as I thereby achieve the emanation of many fine corona streamers from the individual electrodes and thus achieve a more thorough permeation of the material undergoing treatment with the discharge that destroys the insect life. Also, the spacing from the under side of the belt to the grounded elements 10 or 32 is preferably such that the condenser formed therebetween can per se safely withstand the potential of the system inasmuch as the rupture of the dielectrics, resulting in corona discharge, between the electrode tips and the belt, substantially subject the condenser formed by the belt and the grounded elements 10 or 32 to substantially the total voltage of the system. Thus, complete disruption between the electrode tips and the grounded elements 10 or 32 may be safeguarded against.

In the operation of the apparatus the half waves of the alternating potential which are substantially effective are those which cause positive corona streamers at the tips of the electrodes.

It may at this point be noted that the packaged material, such as corn-meal, flour, or the like, and assumed to be contaminated with insect life, may be considered as a heterogeneous dielectric made up of various dielectrics in series multiple arrangement and containing isolated capacities, the latter being the contaminations represented by the various stages of insect life. If the material is packaged, the pasteboard, paper, or the like, of the package itself, constitutes a dielectric of one permittivity, the individual particles of the meal, flour, or the like, constituting a dielectric of still another permittivity, and the air intervening these particles constitute still another dielectric but one of lowest permittivity of all, namely, unity. When this heterogeneous dielectric enters the treatment zone, the dielectrics of higher permittivity cause over-stressing of the air dielectric with resultant ionization and break-down thereof. The contaminating particles, such as insects, eggs, larvæ or pupæ thereof, are, however, of substantially infinite permittivity and are in effect conducting so that the corona streamers virtually seek out and pass through these contaminating particles and thus effectively bringing about their destruction.

In thus preventing complete disruption of the air between the electrode structure and the ground plate 10 or 32, puncturing of the material of the carton is prevented. Were complete disruption to take place, substantially the entire transformer voltage would be impressed upon the material of which the carton is made, with resultant puncturing.

The provision of the opening $20^a$ across which the material to be treated is passed or carried by the belt 17, assures also that flux concentration takes place in the material undergoing treatment; one of the features of action that comes into play in this connection is the fact that, prior to the arrival of the material over the opening, the dielectric medium between the electrode structure 27 and the companion condenser element, frame 10 (or ground 32) is air and hence is of a permittivity of substantially unity but when the material C, either packaged or unpackaged, is interposed between the condenser elements 27 and 10 (or 32), the material, having a much higher permittivity than that of air, causes the flux in the field to concentrate therein on account of the higher permittivity thereof, this concentration being, by the provision of the openings, such as opening $20^a$, not materially disturbed or interfered with. The thus concentrated flux in the material to be treated achieves a rapid ionization of the air intervening the particles of the material where the latter takes the form of flour, meal, or the like, and thus quickly and rapidly achieves the corona discharge therethrough and through the particles of the material to achieve destruction of insect life and the like.

With the material C in position to be subjected to the discharge, the serial arrangement of the low permittivity air dielectric and of the high dielectric of the material itself has above been pointed out; these relatively widely differing permittivities of the corn-meal, for example, and of the remaining air, achieve an electrical capacity of the system greater than the electric capacity that existed before the material C entered this treatment zone so that there is an increase in the resultant current flow; but the available relatively high potential also is somewhat re-distributed because of the serially arranged dielectrics of these differing permittivities and in fact is distributed inversely to the permittivities involved. There is thus achieved a lesser voltage drop across the material undergoing treatment than existed in the equivalent air space before the material came into the treatment zone and this factor contributes also toward safeguarding the package or carton against puncturing.

The above-described actions take place simultaneously between each individual electrode tip $z$ (illustratively four in number as above noted) and the frame 10 or ground 32, and due to the relatively rapid rotation of the electrode structure 27 and the electrode members carried thereby, the substantially vertical axis from one electrode tip to the parts 10 or 32 being moved in a curved path (as viewed in a horizontal plane) crosswise of the package or of the mass of meal, flour, or the like, being transported by the belt and thus, as the articles or product continue to move toward the right, as viewed in Figure 1, all portions of the meal, flour, or the like, are subjected to the actions above-described. Preferably, the dimension of the mass of infested material in a direction crosswise of the belt is less than the diameter of the circle around which the electrode members $27^a$, $27^b$, etc. are spaced and the path of movement is preferably such that the middle point of this lateral dimension passes immediately underneath the axis of rotation of the electrode structure 27. As above pointed out, the direction of rotation is such that the portion $x$ of the electrode members (see Figure 4) is the leading portion while the tip $z$ is the trailing portion, and I have also pointed out the stream-line cross-section of the electrode members. The stream-line cross-section substantially prevents rarefication of air in the regions indicated generally at D in Figure 4 with consequent avoidance of a weakening of the dielectric strength of the air at those portions; thus, the corona discharge is made to emanate from the tip $z$ and not from portions higher up along the electrode members such as might be the case if the dielectric properties of the air were to be weakened as along the portions D. Thus, I am enabled with nicety and precision to control and maintain the actions described above.

It will be clear in view of what has above been said that all portions of the individual electrode members are, of course, maintained at the relatively high potential, but considering any portion of the material undergoing treatment underneath a point E, for example (Figure 4), of the curved portion $y$ to $z$, such point or portion has the effect of commencing the stressing of the air above the material to be treated and of the air intervening the particles of the material to be treated and as the electrode member continues its movement, in its arc of travel, over the particular part or portion of the material under consideration, this stressing or preliminary ionization of this air is increased by way of preparation for corona discharge from the tip portion $z$ which, being lowermost and hence nearest the material undergoing treatment, completes the stressing or ionization of this air to achieve the corona discharge above described.

The spacing between the rollers 15 and 16 that carry the belt 17 is made preferably relatively large so that substantial lengths of belt are interposed between the rollers and the portion of the belt overlying the openings $20^a$ and $20^b$ in the plate support 20 in order thus to minimize leakage or shunting to ground of current discharged from the electrode members through the material undergoing treatment. The belt 17, even though made of cotton, asbestos, canvas, or the like, is virtually a conductor of relatively high resistance and tends to form a shunt as above noted. Also, it is to be noted that the portion of the belt that is at any instant underneath the electrode structure 27 (or 28) does not coincide with an equipotential surface as it extends transversely of the general axis of the discharge from any electrode tip $z$. Accordingly, the portion of the belt under consideration is subjected to differences of potential acting in its plane and these differences of potential cause current flows in the belt. The spacing above-mentioned between the belt-supporting pulleys or rollers with the consequent extensions to the right and left of the belt from the active discharge regions minimizes loss of energy and co-operates to maintain the actions above described.

With respect to the electrode construction 28 and its individual electrode members $28^a$, $28^b$, etc., substantially similar actions as above described take place but the opposite directions of rotation of the electrode structures 27 and 28 come into important consideration where the material undergoing treatment is packaged or contained in cartons, such as pasteboard boxes and the like.

In Figure 6, I have indicated at F by a series of arrows arranged in a circle, the path of movement of the electrode members of the part 27 of Figure 1 and have shown a package $C^1$ about to emerge from the treatment zone and a package $C^2$ having its leading ends already entered into the treatment zone. In Figure 7, I have indicated by the circle of arrows G the path and its direction of the electrode members of the part 28 of Figure 1 and have shown the package $C^1$ about to emerge from the treatment zone and the package $C^2$ with its forward end just entered into the treatment zone. In each instance diagrammatically portrayed in Figures 6 and 7, I have divided the treatment zone into two halves lying to either side of a vertical plane indicated by the line X—X in Figure 6 and line Y—Y in Figure 7.

Considering first Figure 6 and the package $C^2$, it will be noted that, due to the direction of rotation of the electrode structure 27, the electrode tips $z$ pass downwardly (as viewed in Figure 6 which is a plan view) and hence in a curved path across the package $C^2$ while the path of movement of the electrode tips and the above-described action thereof on the package $C^1$ (which has already traversed the path of movement of the package C²) is upwardly and hence crosswise of the package but in a direction reversed from that in which the action took place while the package C¹ was to the left of the plane X—X. These actions are repeated, as is diagrammatically indicated in Figure 7, when the package moves through the treatment zone underneath the rotating electrode 28. The resultant actions are important in that they insure treatment of the material contained in the packages adjacent both side walls a and b of the packages.

Due to certain possible electrical actions that might take place, caused mainly by the vertical walls of the container or package, there is a tendency, considering now the package C² in Figure 6, for the corona discharge to start through the package and hence through its contents only after the particular electrode tip has moved some distance downwardly, as viewed in Figure 6, from the side walls a, leaving the possibility that portions of the contents of the package immediately adjacent the side wall a are untreated; this action has a tendency to take place due to such factors as flux refraction and the concentration of flux along the outer face of the wall a with the tendency to cause the discharge to persist along that outer face from an electrode tip approaching the carton. Such persistence of the discharge over the outer surface persists until the electrode tip has moved over the carton and downwardly (as viewed in Figure 6) a slight distance from the wall a whereupon that surface discharge ceases and the action above-described in detail is established and continues through the remainder of the contents up to the other side wall b. The product is therefore thoroughly treated excepting adjacent the wall a which the electrodes approach as they rotate. But when the package comes into that portion of the treatment zone to the right of the plane X—X of Figure 6, these actions are reversed and whatever of the contents of the package adjacent the wall a where the package occupied the position C² that remained insufficiently treated are now thoroughly treated as the package passes through the position C¹. These actions are repeated when the package passes through the treatment zone under the electrode structure 28.

However, the upper half portion of the leading end wall c (as viewed in Figure 6) acts like the side wall a above-described in connection with the package C² of Figure 6 so that no or an insufficient amount of sterilization of the contents immediately adjacent that half portion takes place while the lower half portion of the leading end wall c, like the side wall b of the package C² of Figure 6, does not have this detrimental action or effect. Stated differently, where the movement of the electrode is in a direction to "wipe" the discharge onto the package, there is insufficient sterilization or failure of sterilization of the product immediately adjacent the side walls of the package while this detrimental action does not take place where the movement of the electrode with respect to the package is in a direction to "wipe" the discharge off of the package. At the rear end wall d of the carton, a similar action takes place excepting that there is failure or deficiency of sterilization of the product adjacent the lower half of the end wall d, as viewed in Figure 6, and complete sterilization of the product adjacent the upper half wall thereof.

However, as the carton C², referring now to Figure 7, becomes subject to the treatment zone under the opposite rotating electrode structure 28, these actions are reversed and any possible absence or deficiency of sterilization of the material adjacent the respective half portions of the end walls is remedied and cured.

It will thus be seen that there has been provided in this invention an art and apparatus in which various objects hereinbefore noted, together with many thoroughly practical advantages, are successfully achieved. The apparatus will be seen to be of a thoroughly practical character and well adapted to meet the varying conditions of practical use.

I do not claim herein the combinations of features and elements whereby, due to movement of the discharge electrode or electrodes, all as hereinabove described particularly in connection with Figures 6 and 7, sterilization of the material adjacent the side or end walls of the package is achieved, having made claims to such subject matter in my co-pending application, Serial No. 577,521, filed November 27, 1931, to which reference should be made in that connection. Also, I make no claim herein to the combinations of features and elements whereby the important actions above described particularly in connection with Figures 4 and 5, are achieved, having claimed that subject matter both broadly and specifically, in my above-mentioned co-pending application to which reference is directed. Also, I make no claim herein to the combinations of features and elements whereby control or predetermination of the various potential drops in the treatment zone is achieved, having claimed that subject matter both broadly and specifically in my co-pending application Serial No. 566,261, filed October 1, 1931, to which reference in that connection is directed.

As many possible embodiments may be made of the mechanical features of the above invention and as the art herein described might be varied in various parts, all without departing from the scope of the invention, it is to be understood that all matter hereinbefore set forth or shown in the accompanying drawing is to be interpreted as illustrative and not in a limiting sense.

I claim:

1. In electrical sterilizing apparatus, in combination, a belt for transporting material to be treated, means for supporting said belt against sagging, electrode means spaced upwardly above said belt and provided with a plurality of discharge tips, a source of relatively high potential of relatively high frequency having its high potential terminal connected to said electrode means and its other terminal at substantially ground potential, and conductive means spaced downwardly from said electrode means and below said belt and at ground potential, the space between said conductive means and said belt being filled with air and the spacing therebetween being such that, when local breakdown occurs from said electrode points through the material on said belt, the electrical capacity between said conductive means and said belt is sufficient to withstand the potential of said source.

2. In electrical sterilizing apparatus, in combination, a belt for transporting material to be treated, means for supporting said belt against sagging, electrode means spaced upwardly above said belt and provided with a plurality of discharge tips, a source of relatively high potential of relatively high frequency having its high potential terminal connected to said electrode means and its other terminal at substantially ground potential, and conductive means spaced downwardly from said electrode means and below said belt and at ground potential, the space between conductive means and said belt being filled with air and the spacing therebetween being such that, when local break-down occurs from said electrode points through the material on said belt, the electrical capacity between said conductive means and said belt is sufficient to withstand the potential of said source, said belt-supporting means being made of non-conductive material and having openings so that the air in said space and the material undergoing treatment lie directly in the path of flux from said electrode means to said conductive means.

3. In electrical sterilizing apparatus, in combination, a source of high potential; means forming a condenser connected across said source of potential, said means comprising electrode means including a plurality of discharge electrodes and conductive means spaced therefrom and of relatively large area, the intervening space being filled with air; and means for supporting material to be treated in relatively close proximity to said electrode means but spaced sufficiently from said conductive means so that the intervening air dielectric can withstand the potential of said source when local break-down takes place through the material.

4. In electrical sterilizing apparatus, in combination, a source of high potential; means forming a condenser connected across said source of potential, said means comprising electrode means including a plurality of discharge electrodes and conductive means spaced therefrom and of relatively large area, the intervening space being filled with air; and conveying means of high resistivity moving along a path to carry material to be treated in relatively close proximity to said electrode means and spaced from said conductive means by a sufficient distance so that the intervening air dielectric is free from break-down when local break-down takes place from electrode means through the material carried by said conveying means.

5. In electrical sterilizing apparatus, in combination, a source of high potential; means forming a condenser connected across said source of potential, said means comprising a plurality of electrode means, each having a plurality of discharge tips, and adapted to be maintained at high potential, and a common conductive means spaced from said plurality of electrode means, the intervening space being filled with air; and means for conveying material to be treated successively past said plurality of electrode means, said conveying means guiding the material along a path spaced from said common conductive means by a distance sufficient to prevent the high potential, during normal sterilizing action, from breaking down the air between the material and said common conductive means.

6. The method of electrically sterilizing material such as food products or the like, which consists in placing the material in a stressed air dielectric at a point in the dielectric field such that local break-down may occur through a portion of the air dielectric and through the material without rupturing the remaining portion of the air dielectric.

7. In electrical sterilizing apparatus, in combination, a plurality of horizontally disposed disk-like members each having a plurality of downwardly directed discharge electrodes; conductive means spaced downwardly from and positioned underneath said disk-like members; means for maintaining a potential difference between said discharge points and said conductive means, the space between the latter comprising air as a dielectric and the spacing therebetween being sufficiently great to prevent break-down therebetween; and means for conveying material to be treated across said air dieletric and to traverse successively the dielectric fields between said disk-like member and said conductive means.

8. In electrical sterilizing apparatus, in combination, a plurality of substantially horizontally disposed disk-like members each having a plurality of downwardly directed discharge electrodes; conductive means underneath and spaced from said disk-like members and being of an area relatively large whereby the voltage gradient is high in the region of said discharge electrodes and relatively low adjacent said conductive means when a suitably high potential difference is impressed thereacross; means for impressing a relatively high potential across said discharge electrodes and said conductive means; and means for interposing a material to be treated in the region of relatively high voltage gradient.

9. In electrical sterilizing apparatus, in combination, a plurality of substantially horizontally disposed disk-like members each having a plurality of downwardly directed discharge electrodes; conductive means underneath and spaced from said disk-like members and being of an area relatively large whereby the voltage gradient is high in the region of said discharge electrodes and relatively low adjacent said conductive means when a suitably high potential difference is impressed thereacross; means for impressing a relatively high potential across said discharge electrodes and said conductive means; and conveying means for conveying a material to be treated along a path adjacent to said discharge electrodes.

10. In electrical sterilizing apparatus, in combination, a plurality of substantially horizontally disposed disk-like members each having a plurality of downwardly directed discharge electrodes; conductive means underneath and spaced from said disk-like members and being of an area relatively large whereby the voltage gradient is high in the region of said discharge electrodes and relatively low adjacent said conductive means when a suitably high potential difference is impressed thereacross; means for impressing a relatively high potential across said discharge electrodes and said conductive means; and means for conveying a material to be treated underneath the discharge electrodes of said disk-like members and in a path so spaced therefrom that local rupture from said discharge electrodes through said material takes place while complete rupture between said discharge electrodes and said conductive means is prevented from taking place.

11. In electrical sterilizing apparatus, in combination, electrode means comprising a plurality of discharge electrodes directed downwardly and having their discharge ends substantially in the same substantially horizontal plane; conductive means of relatively large area spaced downwardly from said electrode means and being of relatively large area and substantially parallel to said substantially horizontal plane, the intervening space being filled with air; means for maintaining a relatively high potential difference between said electrode means and said conductive means, the spacing between the latter two being sufficient to prevent rupture of the air dielectric therebetween; and means for interposing a material to be treated in the dielectric field therebetween but at such a point that local break-down occurs from said discharge electrodes through said material, the air space between the material and said conductive means being sufficiently great to withstand the resultant increased potential difference thereacross.

12. In electrical sterilizing apparatus, in combination, electrode means comprising a plurality of discharge electrodes directed downwardly and having their discharge ends substantially in the same substantially horizontal plane; conductive means of relatively large area spaced downwardly from said electrode means and being of relatively large area and substantially parallel to said substantially horizontal plane, the intervening space being filled with air; means for maintaining a relatively high potential difference between said electrode means and said conductive means, the space between the latter two being sufficient to prevent rupture of the air dielectric therebetween; and a conveyor belt for carrying material to be treated crosswise of the field therebetween but in a path so positioned that local break-down occurs from said discharge electrodes through said material while the air space between the latter and said conductive means is sufficiently great to prevent rupture thereof.

13. The method of electrically sterilizing material such as milled cereal and the like, which consists in passing it through a stressed air dielectric of such dimension in the direction of the path of flow of dielectric flux that the higher permittivity of the material causes local break-down of the dielectric without complete rupture thereof.

14. In electrical sterilizing apparatus, in combination, a belt for transporting material to be treated, electrode means spaced upwardly above said belt and provided with a plurality of discharge tips, a source of relatively high potential of relatively high frequency having its high potential terminal connected to said electrode means and its other terminal at substantially ground potential, and conductive means spaced downwardly from said electrode means and below said belt and at ground potential, the space between conductive means and said belt being filled with air and the spacing therebetween being such that, when local breakdown occurs from said electrode points through the material on said belt, the electrical capacity between said conductive means and said belt is sufficent to withstand the potential of said source, and drums for supporting and moving said belt, said drums being spaced apart and spaced from the treatment zone under said electrode means sufficiently to prevent leakage of high potential energy along said belt to said drums.

15. In electrical sterilizing apparatus, in combination, a belt for transporting material to be treated, means for supporting said belt against sagging, electrode means spaced upwardly above said belt and provided with a plurality of discharge tips, a source of relatively high potential of relatively high frequency having its high potential terminal connected to said electrode means and its other terminal at substantially ground potential, and conductive means spaced downwardly from said electrode means and below said belt and at ground potential, the space between said conductive means and said belt being filled with air and the spacing therebetween being such that, when local break-down occurs from said electrode points through the material on said belt, the electrical capacity between said conductive means and said belt is sufficient to withstand the potential of said source, said belt-supporting means being made of non-conductive material, said belt-supporting means being supported by a part of the apparatus that is at ground potential and being dimensioned to have possible leakage paths from the treatment zone underneath said discharge tips to said ground potential part that are longer than the path at which said high potential can cause creepage of high potential energy.

FRANKLIN S. SMITH.